US011959614B2

(12) United States Patent
Shih

(10) Patent No.: US 11,959,614 B2
(45) Date of Patent: Apr. 16, 2024

(54) VEHICLE LIGHT DEVICE

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 84 days.

(21) Appl. No.: 17/889,165

(22) Filed: Aug. 16, 2022

(65) Prior Publication Data

US 2024/0060618 A1 Feb. 22, 2024

(51) Int. Cl.
*F21S 43/241* (2018.01)

(52) U.S. Cl.
CPC .................................. *F21S 43/241* (2018.01)

(58) Field of Classification Search
CPC ........... F21S 41/24; F21S 43/214; F21V 5/02; F21V 5/045
See application file for complete search history.

(56) References Cited

U.S. PATENT DOCUMENTS 11,846,400 B2 * 12/2023 Yoshino ................ F21S 43/249
2014/0003071 A1 * 1/2014 de Lamberterie ...... F21S 43/14 362/487
2014/0049975 A1 * 2/2014 Lee ......................... F21V 5/004 362/511
2017/0205043 A1 * 7/2017 Tokieda ................... B60Q 1/34
2019/0186708 A1 * 6/2019 Ecker-Endl ........... F21S 41/285
2021/0001942 A1 * 1/2021 Yamada ................ F21S 43/247
2021/0102681 A1 * 4/2021 Sato ........................ F21S 43/14
2021/0310633 A1 * 10/2021 Wolak-Gorczyca ......................... F21S 43/315
2022/0397252 A1 * 12/2022 Kikuchi ................ F21S 43/241

FOREIGN PATENT DOCUMENTS

DE 10314256 * 3/2003 ............ F21S 43/243
KR 1020230143082 * 10/2023 ............ F21S 43/241
WO WO 2023/042707 * 3/2023 ............... G02B 6/00

* cited by examiner

*Primary Examiner* — Zheng Song
(74) *Attorney, Agent, or Firm* — Muncy, Geissler, Olds & Lowe, P.C.

(57) ABSTRACT

A vehicle light device includes a light guide member including a light exist portion that has light exit surfaces, and a light reflection portion that has light reflection surfaces. Each light exit surface is convex, and defines a real focal point disposed forwardly of the light reflection portion. Each light reflection surface is concaved and disposed forwardly of the light exist portion, and defines a virtual focal point superimposed on the real focal point of one of the light exit surfaces, so as to reflect light rays from a light emitter unit into the light guide member toward the respective light exit surface, such that extension lines of the light rays reflected therefrom intersect at the virtual focal point.

9 Claims, 13 Drawing Sheets

VEHICLE LIGHT DEVICE

FIELD

The disclosure relates to a vehicular component, and more particularly to a vehicle light device functioning as a brake light.

BACKGROUND

As shown in FIGS. 1 to 3, an existing vehicle light device includes a base plate 11, a light emitter unit 12 disposed on the base plate 11, and a light guide member 13 that is installed on the base plate 11 and that extends along a left-right direction.

The light emitter unit 12 includes three light emitters 121 that are arranged in a front-rear direction and that are disposed between the base plate 11 and the light guide member 13. The light emitters 121 provide light rays traveling in the left-right direction.

The light guide member 13 includes a light exit portion 14, a light reflection portion 15 that is disposed forwardly of the light exit portion 14, and a light entry portion 16 that is connected between the light exit portion 14 and the light reflection portion 15 and that is adjacent to the light emitter unit 12.

The light exit portion 14 has a flat light exit surface 141. The light reflection portion 15 extends inclindedly from the base plate 11, is inclined rearwardly and outwardly, and includes a plurality of flat light reflection surfaces 151 arranged in the left-right direction. The flat light reflection surfaces 151 each reflect rearwardly the light rays traveling in the left-right direction toward the flat light exit surface 141 so that the light rays are projected outwardly from the flat light exit surface 141 to form a light distribution pattern as depicted in FIG. 3. The light entry portion 16 is formed with three light-collecting structures 161 respectively protruding toward the light emitters 121.

The existing vehicle light device is suitable for use as a brake light to warn a rearward approaching vehicle. However, in terms of a brake light, the light distribution effective region 180 stipulated by the regulations is only located in the central area as shown in FIG. 3. As shown in FIG. 3, each of the first, second, and third looped isocandela contours 181, 182, 183 of the light distribution pattern of the existing vehicle light device is lengthened in a top-bottom direction with respect to the drawing and is in the form of an oval or rectangular shape. Except the first looped isocandela contour 181, which is situated within the light distribution effective region 180, the second and third looped isocandela contours 182, 183 extend outwardly from the light distribution effective region 180 in the top-bottom direction. There is room for improvement.

SUMMARY

Therefore, an object of the disclosure is to provide a vehicle light device that can alleviate at least one of the drawbacks of the prior art.

According to the disclosure, a vehicle light device includes a base plate, a light emitter unit, and a light guide member.

The light emitter unit is disposed on the base plate to emit the light rays along a left-right direction.

The light guide member includes a light guide main body connected to the base plate and extending along the left-right direction. The light guide main body includes a light exist portion, a light reflection portion disposed forwardly of the light exist portion, and a light entry portion that is connected between the light exit portion and the light reflection portion and that is adjacent to the light emitter unit.

The light exist portion has a plurality of light exit surfaces arranged along the left-right directions. Each of the light exit surfaces is convex rearwardly to project rearwardly the light rays emitted from the light emitter unit out of the light guiding member, and defines a real focal point disposed forwardly of the light reflection portion.

The light reflection portion has a plurality of light reflection surfaces arranged along the left-right direction. Each of the light reflection surfaces is concaved, is disposed forwardly of a respective one of the light exit surfaces, and defines a virtual focal point superimposed on the real focal point of the respective one of the light exit surfaces, so as to reflect rearwardly the light rays entering the light guide member toward the respective one of the light exit surfaces, such that extension lines of the light rays reflected therefrom intersect at the virtual focal point.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
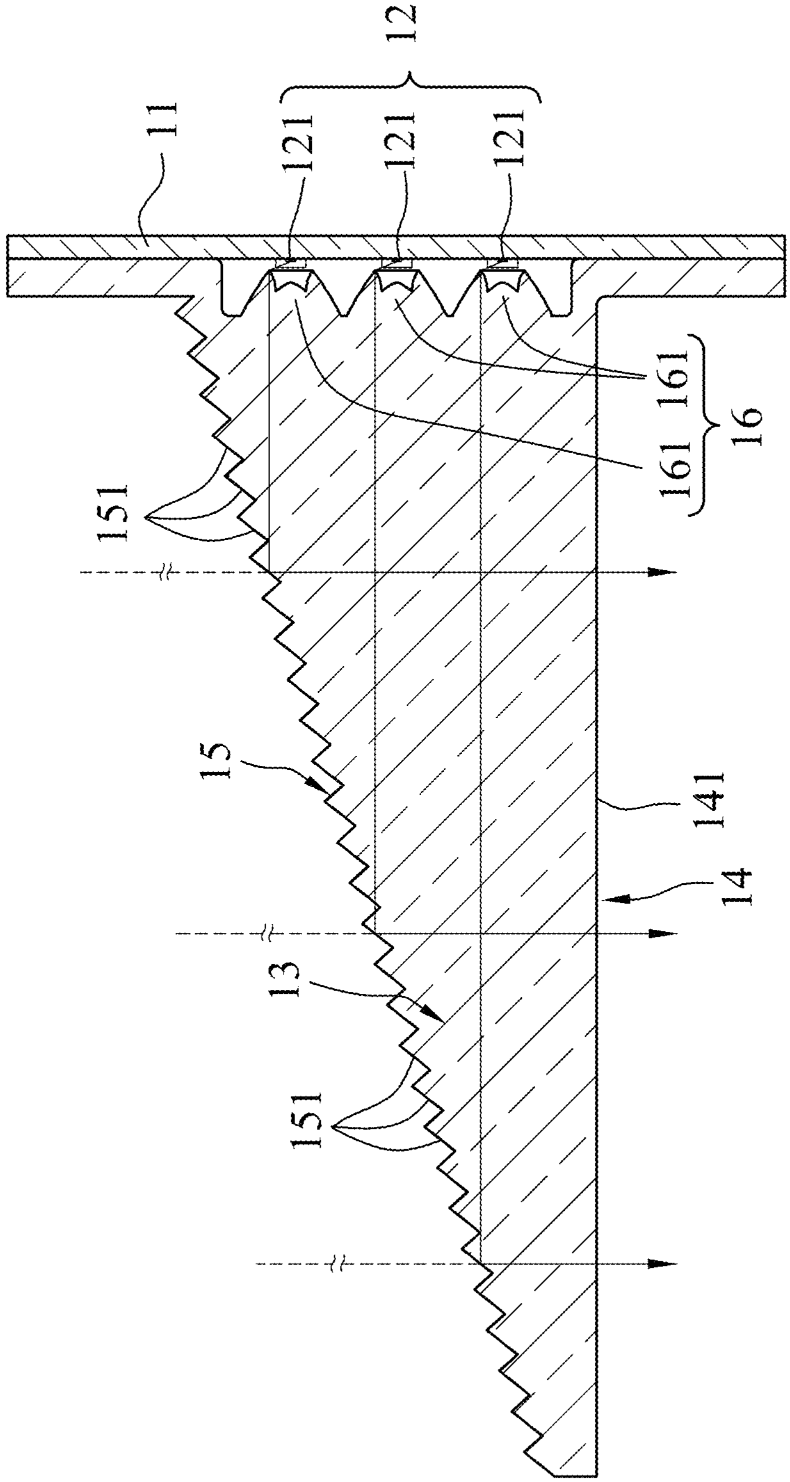
FIG.1 PRIOR ART
FIG. 1 is a schematic sectional view of an existing vehicle light device.
Figure 2:
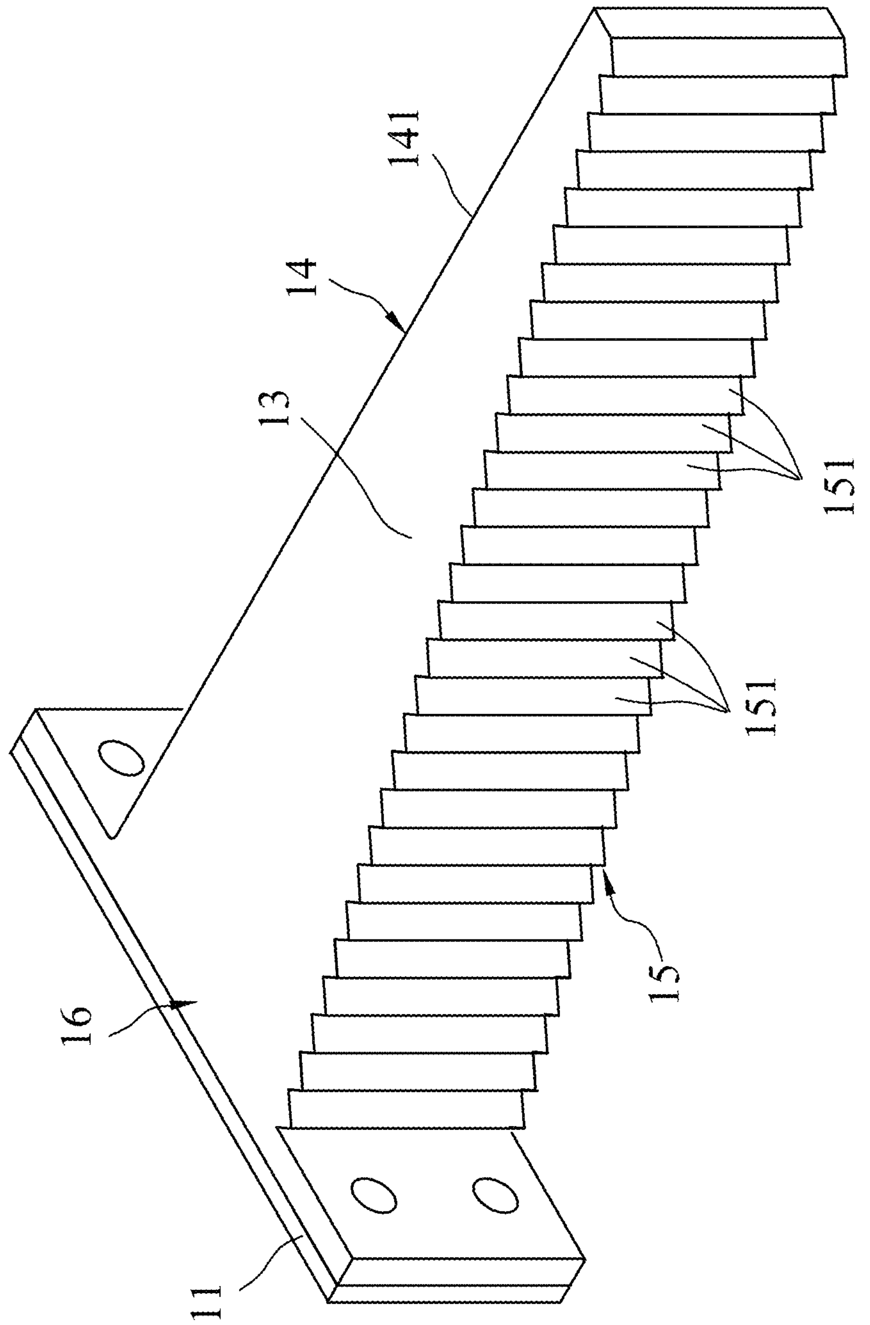
FIG.2 PRIOR ART
FIG. 2 is a perspective view of the existing vehicle light device.
Figure 3:
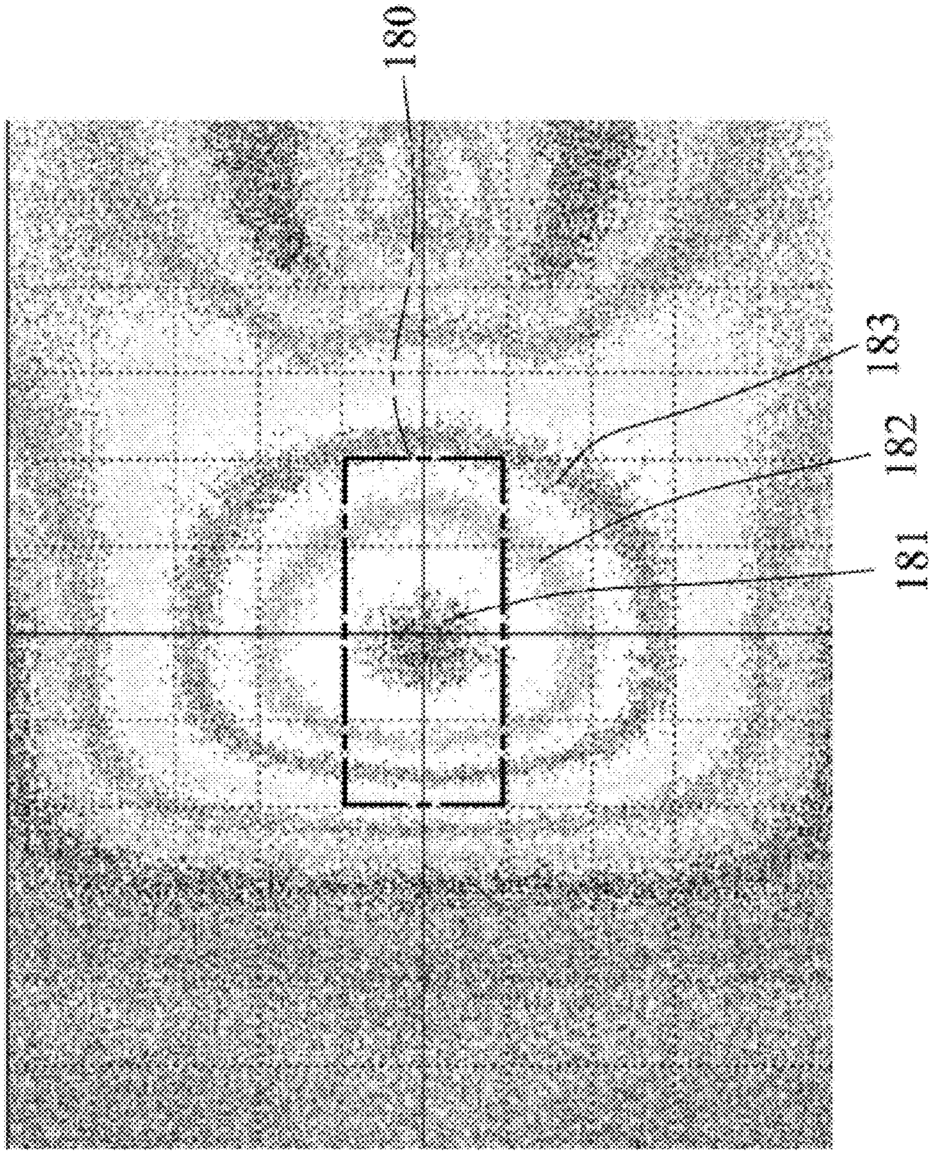
FIG.3 PRIOR ART
FIG. 3 is a light distribution diagram of the existing vehicle light device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
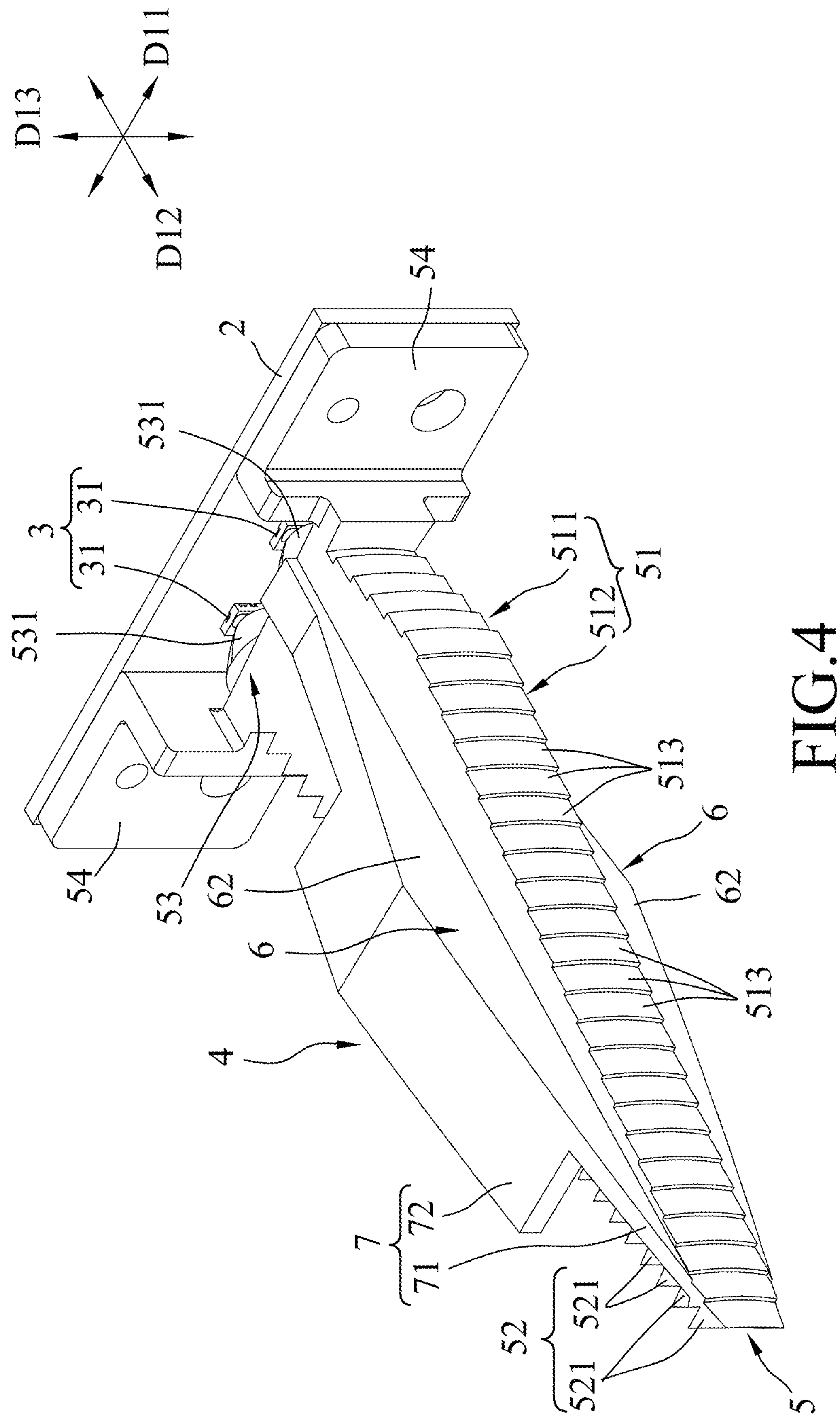
FIG. 4 is a perspective view illustrating a vehicle light device according to a first embodiment of the disclosure.
Figure 5:
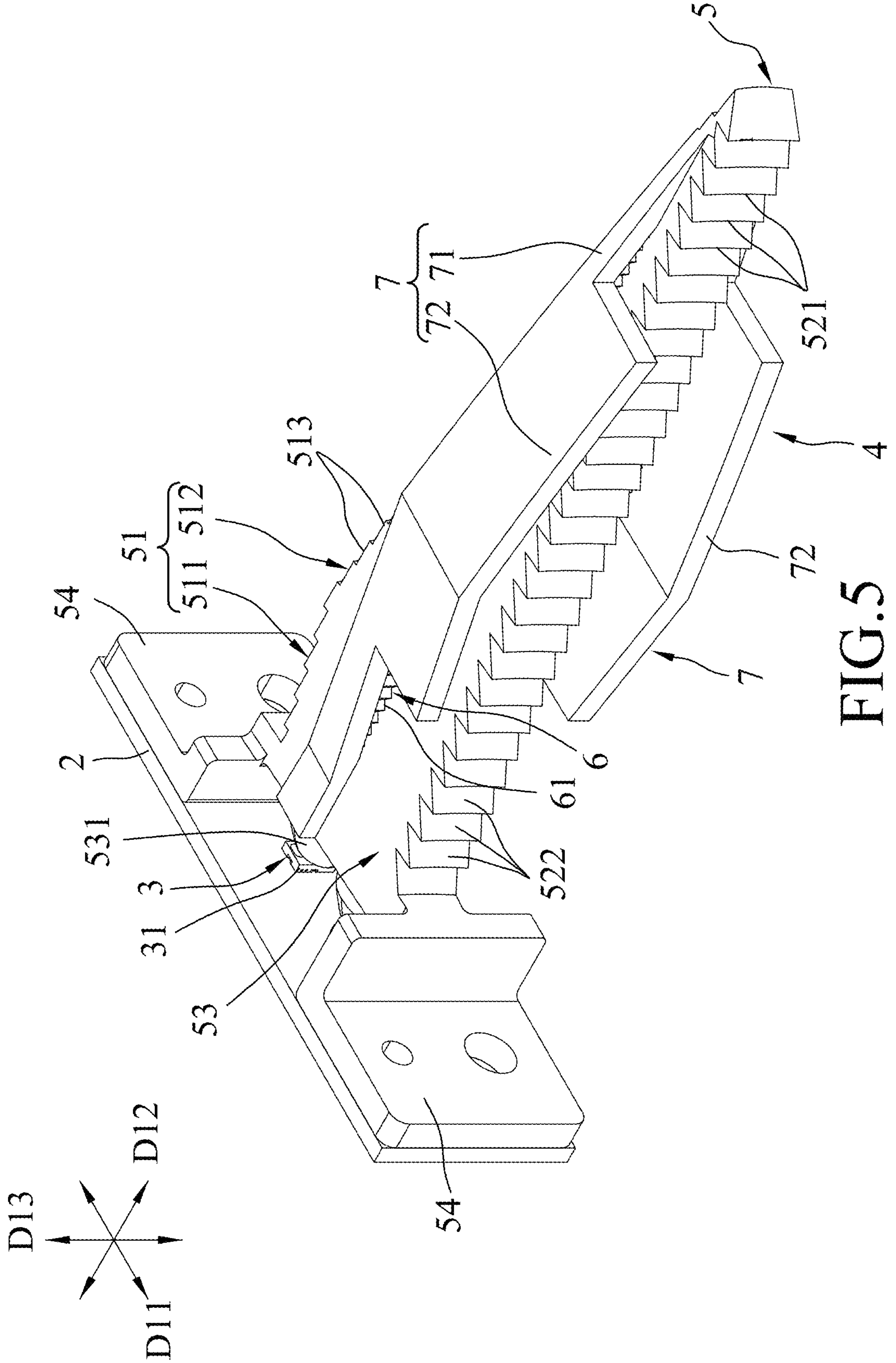
FIG. 5 is a perspective view similar to FIG. 4 but taken from another angle.
Figure 6:
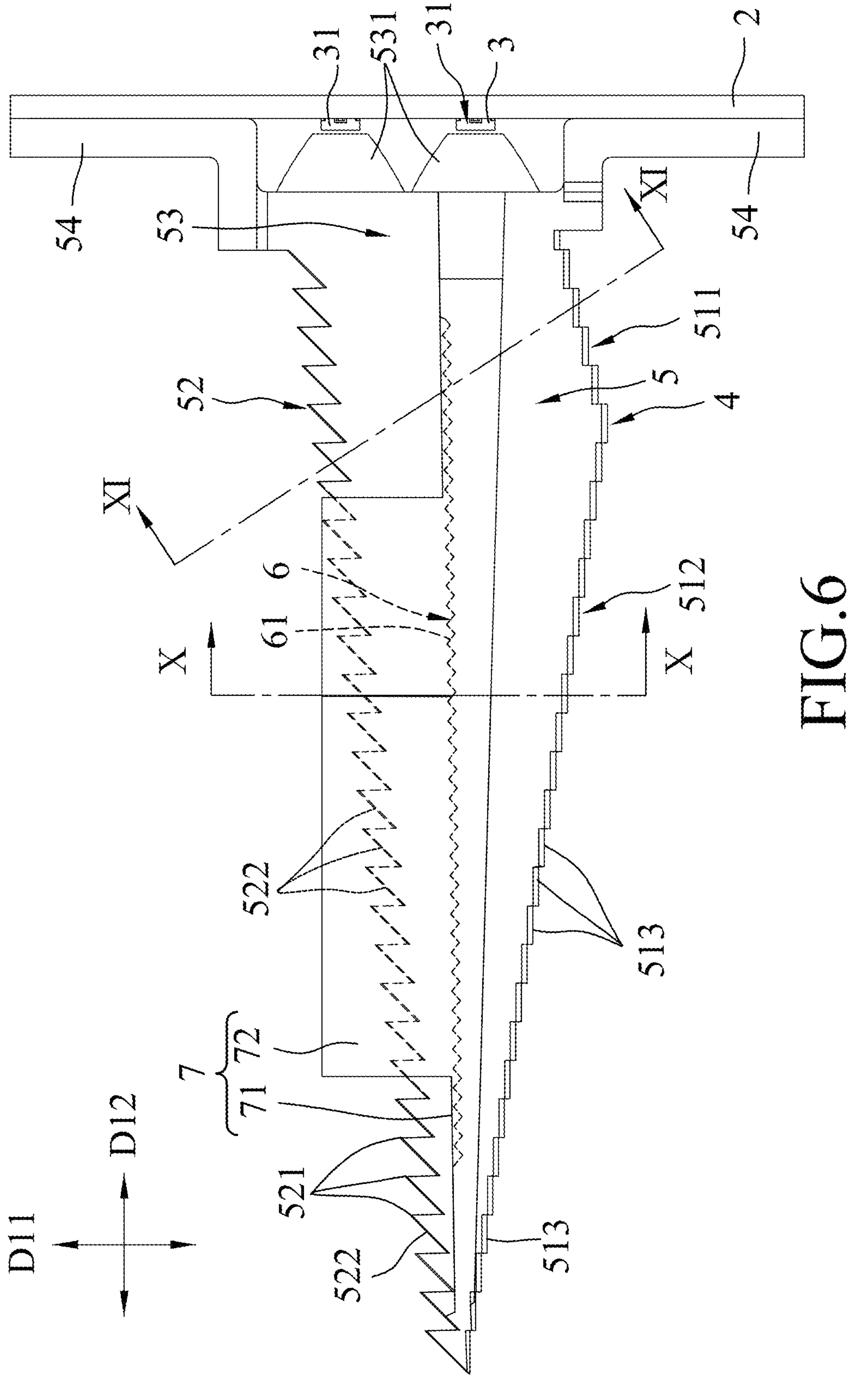
FIG. 6 is a schematic top view of the first embodiment.

Referring to FIGS. 4 to 6, a vehicle light device according to a first embodiment of the disclosure is adapted to be mounted on a vehicle, and serves as a brake light to project rearwardly light rays along a front-rear direction (D11). The vehicle is exemplified as a motorcycle or a car.

As used in the following description, the vehicle light device of the disclosure is mounted on a rear part of the vehicle (not shown), and the front-rear direction (D11) refers to the orientation of the vehicle light device. The vehicle light device includes a base plate 2, a light emitter unit 3, and a light guide member 4.

The base plate 2 serves as a rectangular circuit board lengthened in the front-rear direction (D11) to provide power to and control the light emitter unit 3.

The light emitter unit 3 is disposed on the base plate 2, and includes two light emitters 31 (e.g., LED) that are arranged in the front-rear direction (D11) in a spaced apart manner and that are disposed on the base plate 2. The light emitters 31 are capable of emitting the light rays along a left-right direction (D12) into the light guide member 4. Specifically, each light emitter 31 emits the light rays toward a left side referring to drawings (e.g., FIG. 6).

The light guide member 4 extends in the left-right direction (D12) and is made of a transparent acrylic material so that the light rays emitted from the light emitters 31 can enter, travel inside, and exit the light guide member 4. The light guide member 4 includes a light guide main body 5, two light guide wings 6, and two covering bodies 7.

The light guide main body 5 is connected to the base plate 2 and extends along the left-right direction (D12). The light guide main body 5 includes a light exist portion 51, a light reflection portion 52 disposed forwardly of the light exist portion 51, and a light entry portion 53 that is connected between the light exit portion 51 and the light reflection portion 52 and that is adjacent to the light emitter unit 3. The light guide main body 5 further includes two connection portions 54 that respectively extend from front and rear ends of the light entry portion 53 away from each other and that are fixed to the base plate 2.

Figure 8:
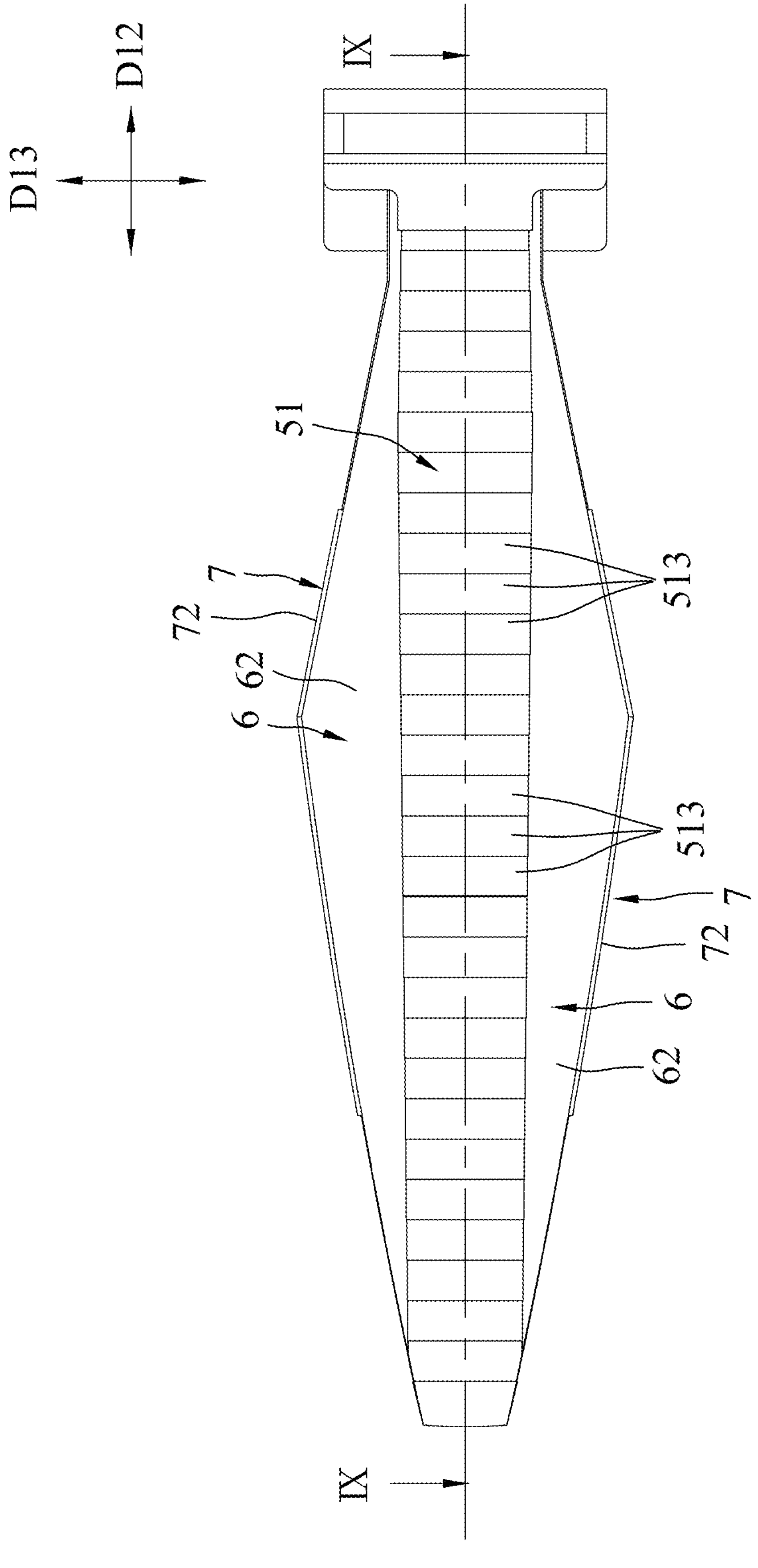
FIG. 8 is a schematic rear view of the first embodiment.
Figure 9:
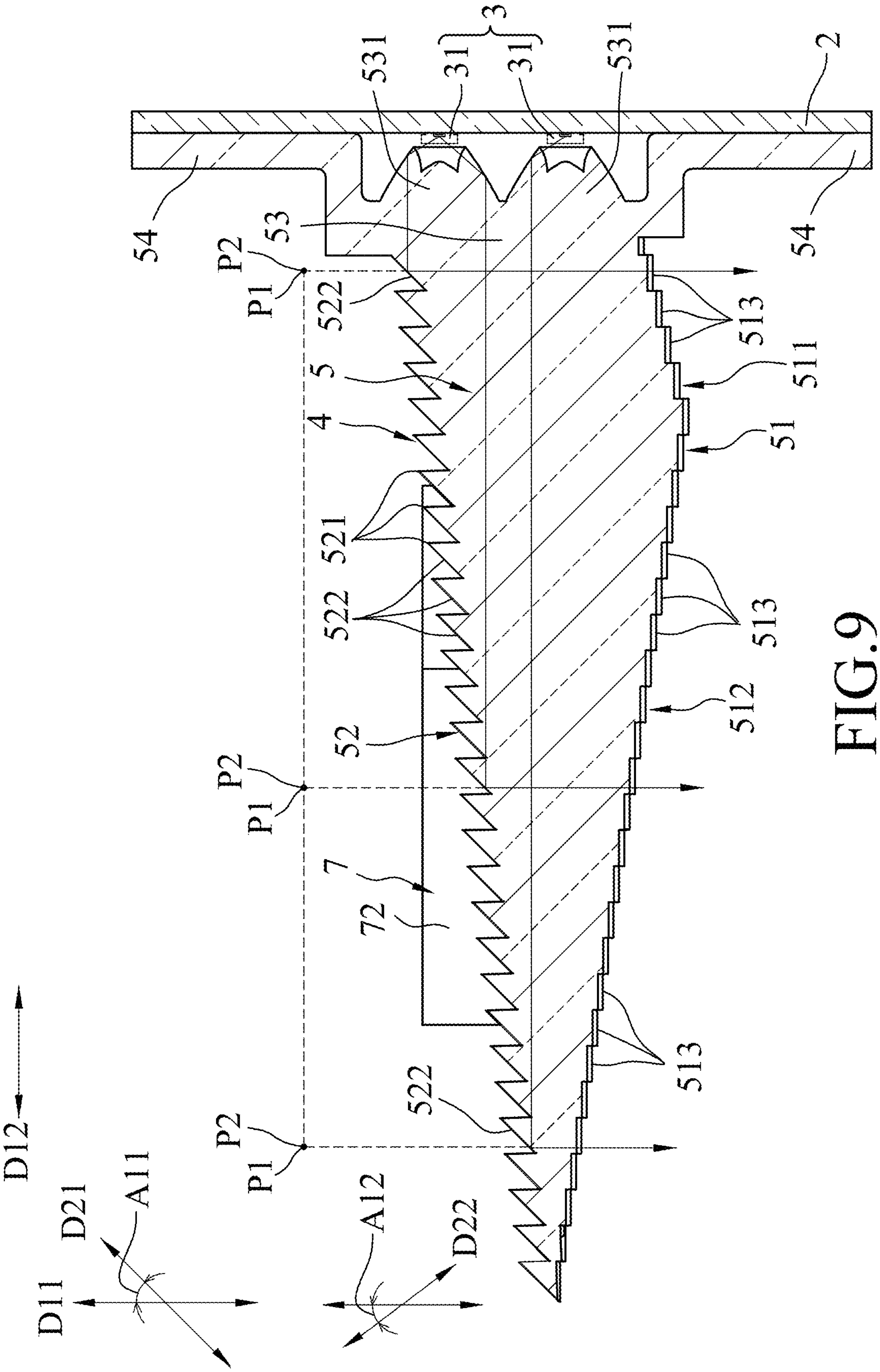
FIG. 9 is a schematic sectional view taken along line IX-IX of FIG. 8.

As shown in FIGS. 4, 8, and 9, the light exist portion 51 has a first light exit segment 511, a second light exit segment 512, and a plurality of light exit surfaces 513.

The first light exit segment 511 extends inclinedly from the base plate 2 and is inclined outwardly and rearwardly.

The second light exit segment 512 extends from an end of the first light exit segment 511 distal from the base plate 2 and is inclined outwardly and forwardly.

The light exit surfaces 513 are arranged along the left-right directions (D12) and are formed on the first and second light exit segments 511, 512.

In this embodiment, any two adjacent ones of the light exit surfaces 513 are spaced apart from each other in the front-rear direction (D11).

Figure 10:
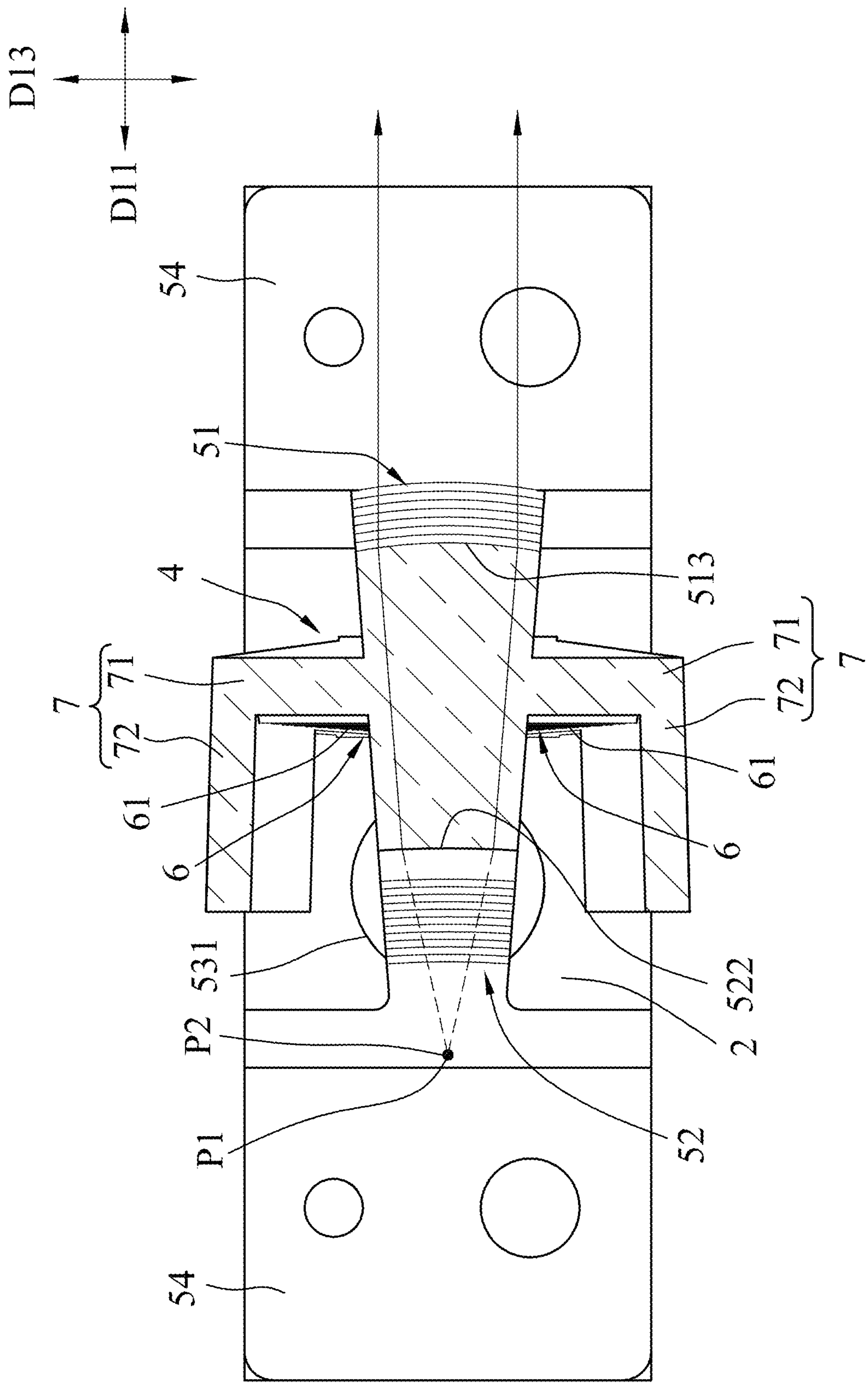
FIG. 10 is a schematic sectional view taken along line X-X of FIG. 6.

Each of the light exit surfaces 513 has a width in the left-right direction (D12), and a length in a top-bottom direction (D13). As shown in FIGS. 9 and 10, each light exit surface 513 is convex rearwardly, as shown in FIG. 4, so as to project rearwardly the light rays emitted from the light emitter unit 3 out of the light guiding member 4, and defines a real focal point (P1) disposed forwardly of the light reflection portion 52. The curvatures of the light exit surfaces 513 are slightly different from one another in design such that the real focal points (P1) of the light exit surfaces 513 are aligned with one another.

Figure 7:
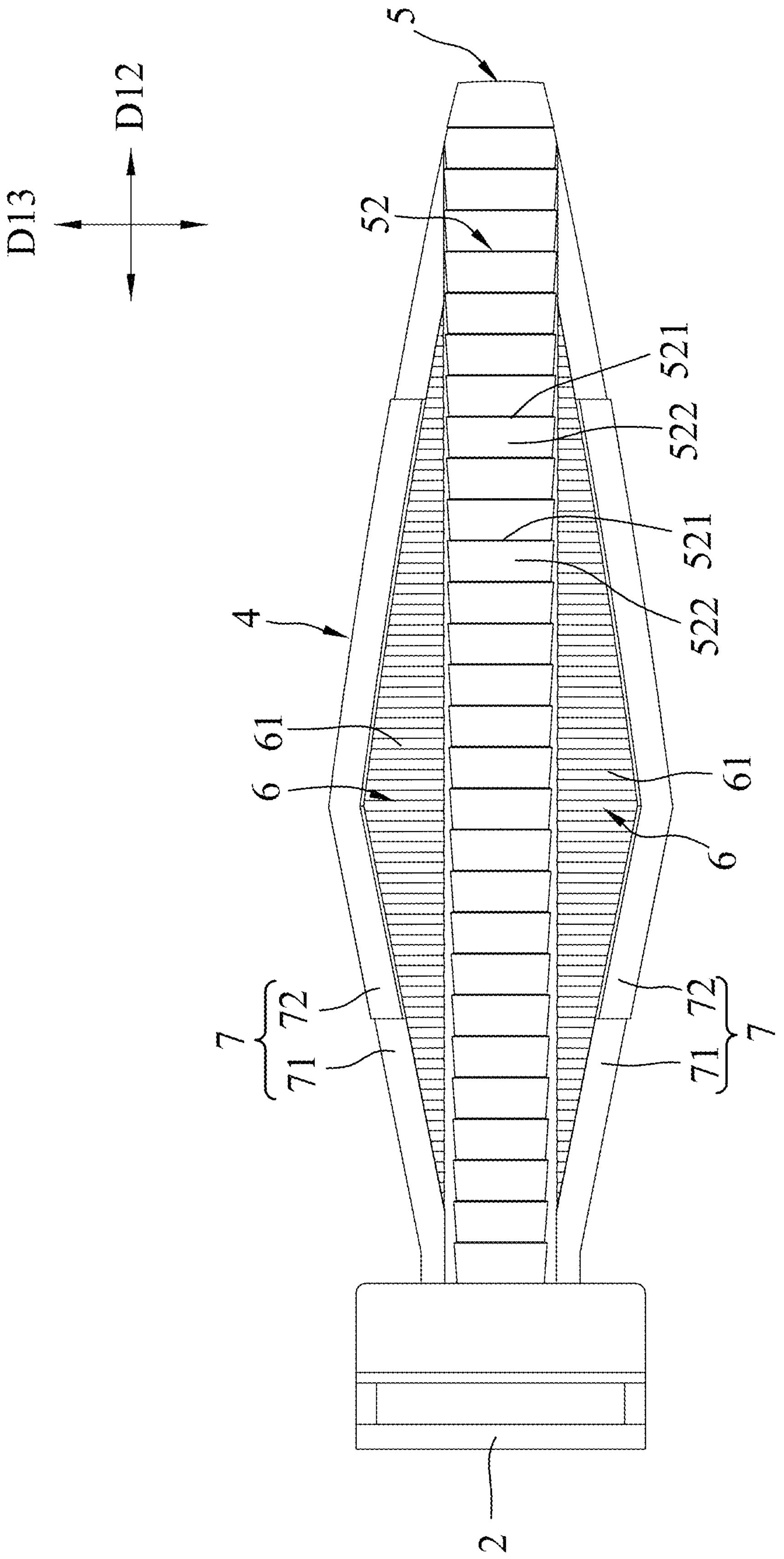
FIG. 7 is a schematic front view of the first embodiment.

As shown in FIGS. 5, 7, and 9, the light reflection portion 52 is connected between the light entry portion 53 and the second light exit segment 512, and is inclined outwardly and rearwardly. The light reflection portion 52 has a plurality of light reflection surfaces 522 arranged along the left-right direction (D12), and a plurality of flank segments 521 each connected between two adjacent ones of the light reflection surfaces 522. Each of the light reflection surfaces 522 has a length in the top-bottom direction (D13), and a width in a first oblique direction (D21). The first oblique direction (D21) and the front-rear direction (D11) defines an oblique angle (A11) of 45 degrees. However, in other embodiments, the oblique angle (A11) can range between 35 and 70 degrees.

As shown in FIGS. 6, 9 to 11, the light reflection surfaces 522 are spaced apart from one another in the left-right direction (D12). Each of the light reflection surfaces 522 is concaved, and is disposed forwardly of a respective one of the light exit surfaces 513. In this embodiment, each of the light reflection surfaces 522 is a total internal reflection surface, is concaved along a second oblique direction (D22) transverse to the first oblique direction (D21), and defines a virtual focal point (P2) superimposed on the real focal point (P1) of the respective one of the light exit surfaces 513. The second oblique direction (D22) and the front-rear direction (D11) defines a projection angle (A12) of 45 degrees. The virtual focal points (P2) of the light reflection surfaces 522 are aligned with one another. In other embodiment, the projection angle (A12) ranges between 35 and 70 degrees.

The light entry portion 53 is formed with two light collecting structures 531 that are arranged in a front-rear direction (D11) and that are oriented toward the light emitter unit (3) along the left-right direction (D12). In this embodiment, each light collecting structure 531 has a cup-shaped cross section and protrudes toward a respective one of the light emitters 31, so that the light emitters 31 can respectively emit the light rays into the light collecting structures 531.

As shown in FIGS. 5, 7, and 8, the light guide wings 6 respectively extend from top and bottom sides of the light guide main body 5 along the top-bottom direction (D13) away from each other. As shown in FIG. 7, each light guide wing 6 is in the form of a triangular shape and has a sawtooth surface 61 facing forwardly and a flat surface 62 facing rearwardly (see FIG. 8).

The covering bodies 7 respectively cover the light guide wings 6 along the top-bottom direction (D13). Each of the covering bodies 7 has a main cover portion 71 that extends in left-right direction (D12) and that covers a respective one of the light guide wings 6, and an extension portion 72 that extends forwardly from a middle portion of the main cover portion 71. The extension portion 72 of each of the covering bodies 7 has a V-shaped cross section that is open toward the extension portion 72 of the other one of the covering bodies 7 and that has a front side disposed forwardly of some of the light reflection surfaces 522.

Figure 11:
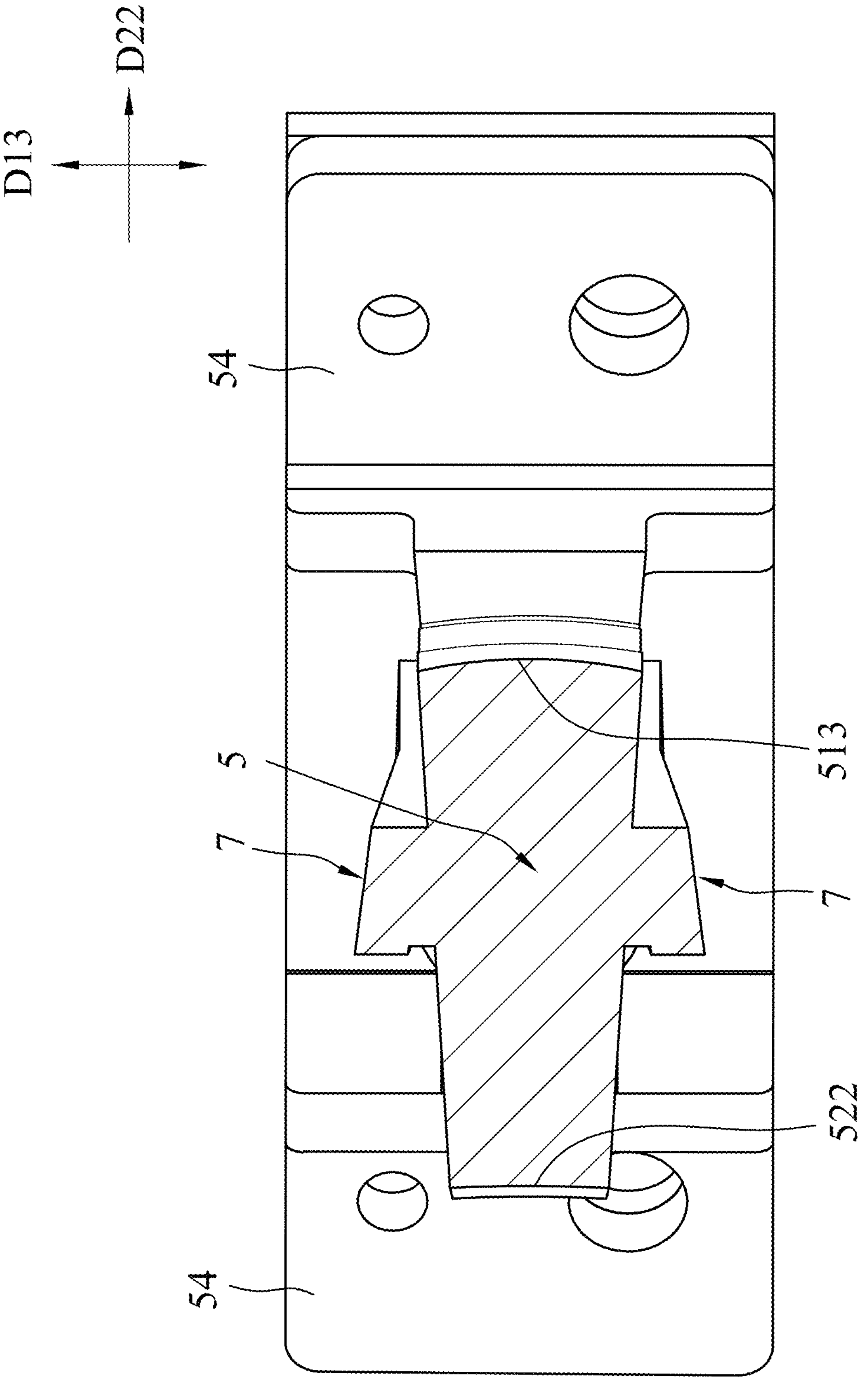
FIG. 11 is a schematic sectional view taken along line XI-XI of FIG. 6.

Referring to FIGS. 9 to 11, in operation of the vehicle light device of the disclosure, when the light rays emitted from the light emitters 31 into the light collecting structures 531 travel to the light reflection surfaces 522, each light reflection surface 522 reflects rearwardly the light rays toward the respective one of the light exit surfaces 513, such that extension lines of the light rays reflected therefrom intersect at the corresponding virtual focal point (P2).

Because the virtual focal point (P2) of each light reflection surface 522 is superimposed on the real focal point (P1) of the respective light exit surface 513, effects of the light rays reflected by the light reflection surfaces 522 are same as effects of the light rays projected by the real focal points (P1) of the light exit surfaces 513. Further, because each light reflection surface 522 reflects rearwardly the light rays toward the respective one of the light exit surfaces 513, the reflected light rays are collected and projected by the light exit surfaces 513 to form a light distribution pattern as shown in FIG. 12.

Figure 12:
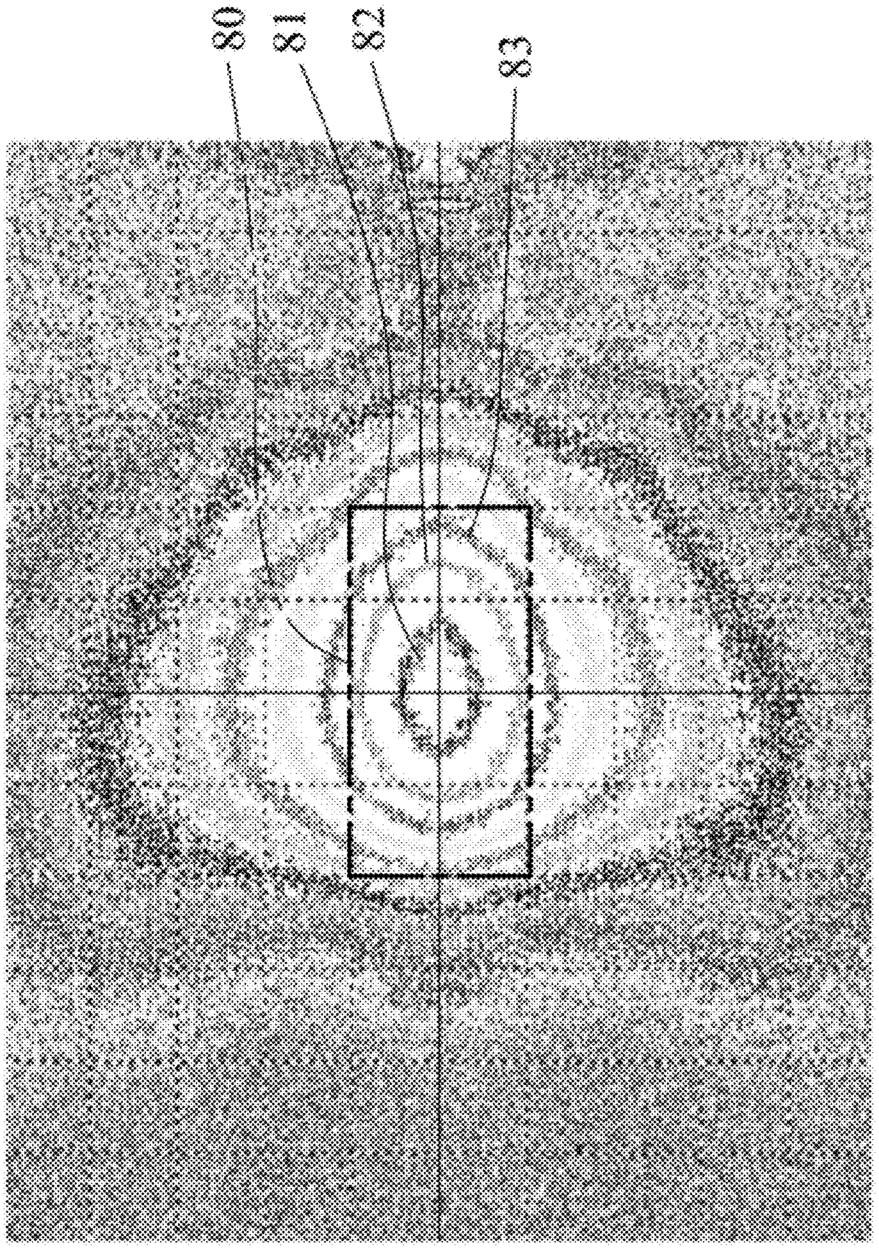
FIG. 12 is a light distribution diagram of the first embodiment.

As shown in FIG. 12, by virtue of the light reflection surfaces 522 in cooperation with the light exit surfaces 513, the light distribution pattern of the disclosure is more concentrated in an effective light distribution area 80 stipulated by regulations in comparison with that of the prior art. In this embodiment, each of the first, second, and third looped isocandela contours 81, 82, 83 of the light distribution pattern is lengthened in a leftward and rightward direction with respect to the drawing and is in the form of an oval shape, such that the luminous intensities bordered by the first, second, and third looped isocandela contours 81, 82, 83 are more sufficiently distributed in the effective light distribution area 80 in comparison with the prior art. Since only two light emitters 31 and two light collecting structures 531 are required for distribution of the luminous intensity in the effective light distribution area 80, material costs can be reduced, energy consumption can be saved, and waste heat generated from the light emitter unit 3 can be lowered.

Noteworthily, the virtual focal point (P2) of each light reflection surface 522 is partially or entirely superimposed on the real focal point (P1) of the respective light exit surface 513.

Referring to FIGS. 7, 9, and 10, aligning the virtual focal points (P2) of the light reflection surfaces 522 is advantageous to optical design. As shown in FIG. 10, the curvatures of the light reflection surfaces 522 are designed to be similar or identical to one another. The sawtooth surfaces 61 and the flat surface 62 of the light guide wings 6 are cooperated with each other to form two additional luminous warning triangular areas by using residual light rays emitted from the light exit portion 51, thereby increasing a visible arear which can be noticed by other drivers. The covering bodies 7 protect the light guide wings 6 and the light guide member 4.

Figure 13:
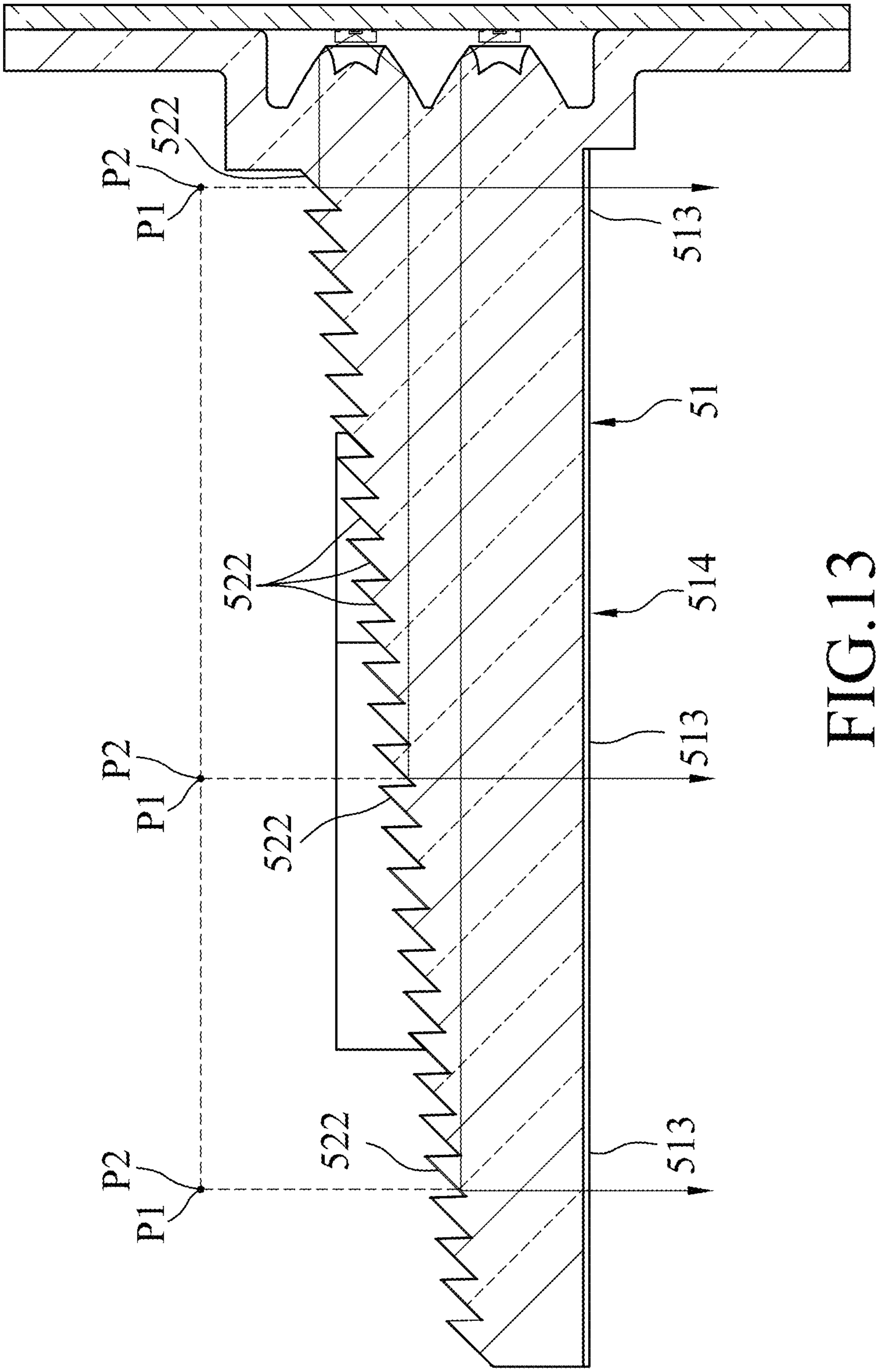
FIG. 13 is a schematic sectional view illustrating a vehicle light device according to a second embodiment of the disclosure.

FIG. 13 illustrates a vehicle light device according to a second embodiment of the disclosure, which has a structure generally similar to that of the first embodiment. However, in the second embodiment, the curvatures of the light exit surfaces 513 of the light exist portion 51 are designed to be identical to one another, and the light exit surfaces 513 cooperate with one another to form a light exit face 514 in the form of a portion of a cylindrical surface, so that light exit face 514 has a simple structure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle light device adapted for rearwardly projecting light rays, comprising:

a base plate;

a light emitter unit disposed on said base plate to emit the light rays along a left-right direction; and a light guide member including a light guide main body connected to said base plate and extending along the left-right direction, said light guide main body including a light exit portion, a light reflection portion disposed forwardly of said light exit portion, and a light entry portion that is connected between said light exit portion and said light reflection portion and that is adjacent to said light emitter unit;

wherein said light exit portion has a plurality of light exit surfaces arranged along the left-right directions, each of said light exit surfaces being convex rearwardly to project rearwardly the light rays emitted from said light emitter unit out of said light guiding member, and defining a real focal point disposed forwardly of said light reflection portion; and wherein said light reflection portion has a plurality of light reflection surfaces arranged along the left-right direction, each of said light reflection surfaces being concaved, being disposed forwardly of a respective one of said light exit surfaces, and defining a virtual focal point superimposed on said real focal point of the respective one of said light exit surfaces, so as to reflect rearwardly the light rays entering said light guide member toward the respective one of said light exit surfaces, such that extension lines of the light rays reflected therefrom intersect at said virtual focal point.

2. The vehicle light device as claimed in claim 1, wherein:

said light exit portion further has a first light exit segment extending inclinedly from said base plate and inclined outwardly and rearwardly, and a second light exit segment that extends from an end of said first light exit segment distal from said base plate and that is inclined outwardly and forwardly, said light exit surfaces being formed on said first and second light exit segments; and said light reflection portion is connected between said light entry portion and said second light exit segment, and is inclined outwardly and rearwardly.

3. The vehicle light device as claimed in claim 1, wherein:

each of said light exit surfaces has a width in the left-right direction, and a length in a top-bottom direction;

each of said light reflection surfaces has a length in the top-bottom direction, and a width in a first oblique direction, the first oblique direction and a front-rear direction defining an oblique angle ranging between 35 and 70 degrees, each of said light reflection surfaces being concaved along a second oblique direction transverse to the first oblique direction, the second oblique direction and the front-rear direction defining a projection angle ranging between 35 and 70 degrees.

4. The vehicle light device as claimed in claim 1, wherein each of said light reflection surfaces is a total internal reflection surface defining said virtual focal point thereof.

5. The vehicle light device as claimed in claim 4, wherein said virtual focal points of said light reflection surfaces are aligned with one another.

6. The vehicle light device as claimed in claim 1, wherein said light guide member further includes two light guide wings respectively extending from top and bottom sides of said light guide main body along a top-bottom direction away from each other, each of said light guide wings having a sawtooth surface facing forwardly and a flat surface facing rearwardly.

7. The vehicle light device as claimed in claim 6, wherein said light guide member further includes two covering bodies respectively covering said light guide wings, each of said covering bodies having a main cover portion that extends in left-right direction and that covers a respective one of said light guide wings, and an extension portion that extends forwardly from a middle portion of said main cover portion, said extension portion of each of said covering bodies having a V-shaped cross section that is open toward said extension portion of the other one of said covering bodies and having a front side disposed forwardly of some of said light reflection surfaces.

8. The vehicle light device as claimed in claim 1, wherein:

said light entry portion is formed with two light collecting structures that are arranged in a front-rear direction and that are oriented toward said light emitter unit along the left-right direction; and said light emitter unit includes two light emitters that are arranged in the front-rear direction and that are disposed on said base plate to emit the light rays into said light collecting structures.

9. The vehicle light device as claimed in claim 1, wherein:

said light emitter unit includes two light emitters that are arranged in a front-rear direction and that are disposed on said base plate;

said light exit portion further has a first light exit segment extending inclinedly from said base plate and inclined outwardly and rearwardly, and a second light exit segment that extends from an end of said first light exit segment distal from said base plate and that is inclined outwardly and forwardly;

said light exit surfaces are formed on said first and second light exit segments, each of said light exit surfaces having a width in the left-right direction, and a length in a top-bottom direction;

said light reflection portion is connected between said light entry portion and said second light exit segment, each of said light reflection surfaces has a length in the top-bottom direction, and a width in a first oblique direction, the first oblique direction and a front-rear direction defining an oblique angle ranging between 35 and 70 degrees, each of said light reflection surfaces being a total internal reflection surface, being concaved along a second oblique direction transverse to the first oblique direction, and defining the virtual focal point, the second oblique direction and the front-rear direction defining a projection angle ranging between 35 and 70 degrees, said virtual focal point of each of said light reflection surfaces being superimposed on said real focal point of the respective one of said light exit surfaces, said virtual focal points of said light reflection surfaces being aligned with one another;

said light entry portion is formed with two light collecting structures that are arranged in the front-rear direction and that respectively protrude toward said light emitters of said light emitter unit so that said light emitters emit the light rays into said light collecting structures;

said light guide member further includes two light guide wings respectively extending from top and bottom sides of said light guide main body along a top-bottom direction away from each other, and two covering bodies respectively covering said light guide wings;

each of said light guide wings has a sawtooth surface facing forwardly and a flat surface facing rearward; and each of said covering bodies has a main cover portion that extends in left-right direction and that covers a respective one of said light guide wings, and an extension portion that extends forwardly from a middle portion of said main cover portion, said extension portion of each of said covering bodies having a V-shaped cross section that is open toward said extension portion of the other one of said covering bodies and that has a front side disposed forwardly of said light reflection surfaces.

* * * * *